UNITED STATES PATENT OFFICE 2,138,685

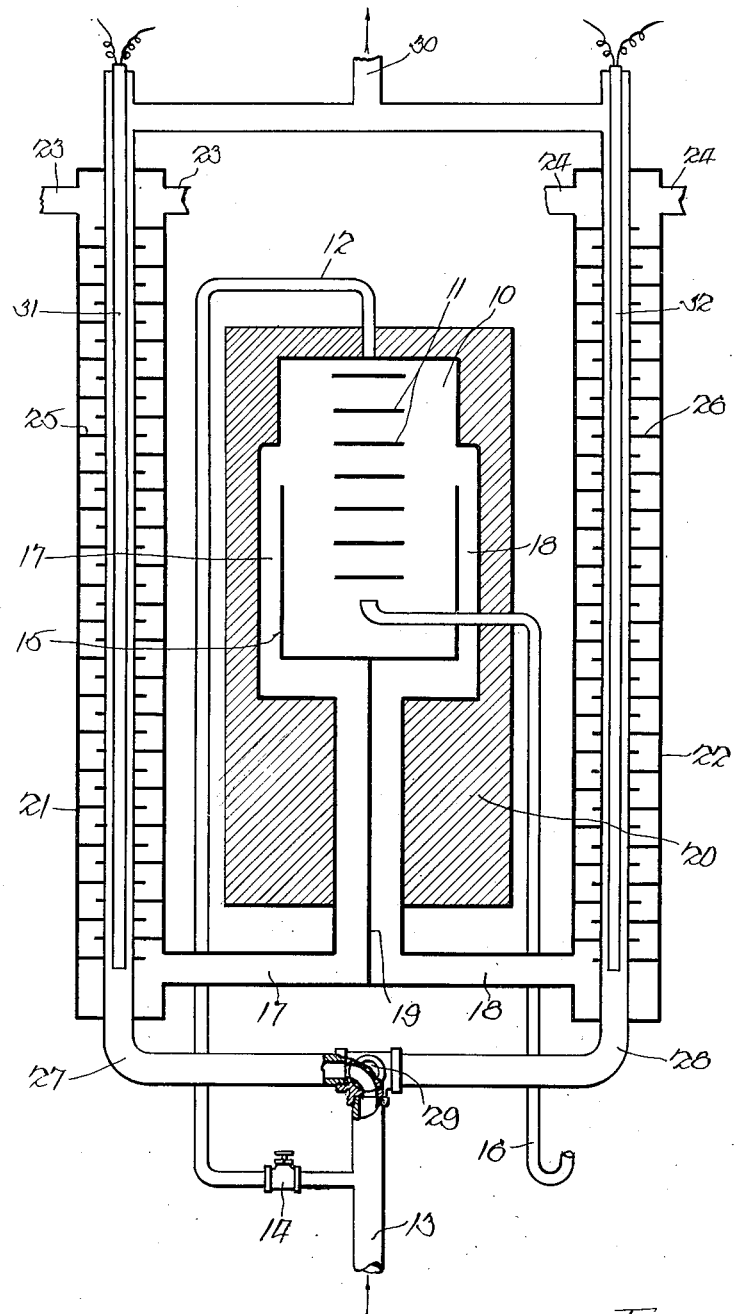

REFRIGERATING APPARATUS

Edmund Altenkirch, Neuenhagen, near Berlin, Germany

Application February 17, 1934, Serial No. 711,680
In Germany February 24, 1933

17 Claims. (Cl. 62—156)

This invention relates to refrigerating apparatus and more particularly to means for cooling drinking water for domestic purposes.

It is well known that silica gel, charcoal, certain kinds of wood and other substances have the property of adsorbing water or other refrigerating fluid at one temperature and discharging the water or fluid when heated to a slightly higher temperature. It is also known that certain liquids such as sulphuric acid and lye solution have the property of absorbing at a given temperature and discharging the water at a higher temperature when heated. Intermittently operating refrigerating devices based upon the aforesaid properties are also well known.

It is an object of the present invention to utilize the above mentioned properties of the substances mentioned for the purpose of cooling drinking water, and to provide a novel, inexpensive and practical apparatus for doing so.

It is another object to provide an extremely simple arrangement for the cooling of water or other fluids in which the heat input to the apparatus is at a low temperature. In some cases the heat may be derived from air in a dwelling house alone or from the sun.

Other objects and advantages reside in certain novel features of the arrangement and construction of parts as will be apparent from the following description taken in connection with the accompanying drawing in which:

The single figure is a diagrammatic representation of water cooling apparatus in which the principles of the present invention are embodied.

Referring to the drawing in detail it will be seen that the apparatus includes an evaporator 10 which may be merely a cylindrical vessel provided with a number of baffle plates 11. Water may be conveyed to the evaporator 10 by a conduit 12 connected to a water supply conduit 13. The conduit 12 may be provided with a valve 14. As water trickles downwardly over the baffle plates 11 some of it evaporates and cools the remainder. This may be collected in the pan 15 and conveyed away from the cooling device through the conduit 16 which may lead to a drinking fountain or the like, not shown.

The evaporator 10 is also supplied with air conduits 17 and 18 which may be formed as part of the evaporating chamber, as shown, or which may be separate conduits. The conduits 17 and 18 pass downwardly below the evaporator and in heat exchange relation with each other at the heat exchanger 19, embedded in the insulation 20 around the evaporator. Below the heat exchanger, the conduits 17 and 18 divide, conduit 17 passing to the left as shown in the figure and the conduit 18 to the right. The horizontal portions of conduits 17 and 18 are connected to vertically extending chambers 21 and 22 respectively which in the arrangement shown extend from a point below the evaporator to a point above the same. The upper ends of the chambers 21 and 22 are open to the atmosphere through the conduits 23 and 24. If desired the conduits 23 and 24 may be connected to fans or blowers for forcing air through the apparatus over the circuits described hereinafter, but in the form of the invention shown, the air is caused to flow by convection only.

The chambers 21 and 22 are provided with the number of baffle plates adapted to support adsorbing or absorbing material, (referred to in the claims as absorbing material) as for example silica gel or sulphuric acid. The baffle plates 25 and 26 may be of any suitable shape adapted to the particular substance used and may be perforated or cup-shaped or otherwise formed in a known manner to adapt them to the particular substance used.

Means is provided for alternately heating and cooling each of the chambers 21 and 22. Cooling is effected by means of pipes 27 and 28 which may be alternately connected to the supply conduit 13 by means of the two-way valve 29. The water in the conduit 13 is at a lower temperature than that prevailing in the chambers 21 and 22 during operation. Hence either of these chambers may be cooled by manipulating valve 29.

The water conduits 27 and 28 after passing vertically upwardly through the chambers 21 and 22 are bent inwardly and connected to the outlet conduit 30. Located inside of each of the water conduits 27 and 28 is an electric heater. These heaters are designated 31 and 32 respectively, and extend nearly the whole length of the chambers 21 and 22. Means is thus provided for heating either of the chambers.

The apparatus operates as follows: To put the apparatus in operation the valve 29 may be positioned as shown. The water supplied to the dwelling house through the conduit 13 then flows through the left branch or conduit 27 and cools the adsorbing or absorbing substance on the plates 25 in the chamber 21. Because the water supplied to a dwelling house is ordinarily at a lower temperature than that of the air in the house, the air in the chamber 21 will become heavier than that in the chamber 22. This will cause the air to flow downwardly in the chamber 21, through the conduit 17 into the evaporator 10, out of the evaporator through the conduit 18 and then upwardly through the chamber 22 which remains at room temperature. In this way air is drawn into the chamber 21 through the conduit 23 and discharged from the chamber 22 through the conduit 24 by convection. The passage of air through the apparatus in the direction indicated will be increased if heat is now applied through the electric heater 32 to the air in the chamber 22. Heat is readily transferred to the air in the chamber 22 from the electrical heater because of the fact that the water in the chamber 28 will, during this portion of the cycle, be stagnant and provide good heat discharge means to plates 26 in the chamber 22.

As air passes downwardly through the chamber 21, maintained at the low temperature of the water in conduit 13, some of the water in the air in chamber 21 will be adsorbed by the absorbing or adsorbing substance on the plates 25, so that the air supplied to the evaporator 10 through the conduit 17 will be relatively dry. As the air supplied to the evaporator is exposed to the water trickling down over the baffle plates 11 some of the water in the evaporator will evaporate into the air and thus cool the remainder. The cooled water then passes out of the apparatus through the conduit 16. As the air passes from the evaporator 10 through the conduit 18 into the chamber 22, it does not give up its moisture to the adsorbing or absorbing material in the chamber 22 because this chamber is being heated during this portion of the cycle. As a matter of fact, additional moisture will be given up to the air in the chamber 22 so that the silica gel or other adsorbing or absorbing material in the chamber 22 will become quite free from moisture.

After the apparatus has operated as indicated for a certain period of time the valve 29 may be switched (automatically or manually), the circuit for the electric heater 31 closed, and the circuit for the electric heater 32 opened. The cycle will then be reversed, air passing downwardly through the chamber 22, entering this chamber through the pipe 24 and passing through the conduit 18 into the evaporator 10, from there to the conduit 17 into the lower portion of the chamber 21 and upwardly through this chamber back into the atmosphere through the conduit 23. Because of the fact that in the previously described portion of the cycle the adsorbing material in the chamber 22 was dried out to some extent, the air entering the evaporator 10 through the conduit 18 will now be of a lower moisture content than that mentioned previously during the initial starting portion of the cycle and the water in the evaporator 10 will be brought to a sufficiently low temperature. Thus it will be seen that as the cycle reverses periodically, the air supplied to the evaporator will be of a lower and lower humidity so that the water will evaporate more readily into the air in the evaporator.

While electric heaters are shown in the drawing, it is to be understood that the invention is not limited to the use of such devices. Gas burners, steam pipes, etc., may be effectively employed. It is also within the purview of the invention to use the heat of the sun for alternately warming the water in the pipes 27 and 28. Under some circumstances, it may even be of advantage to use the air in the room to supply heat to the chambers 21 and 22, especially where the water supplied through the pipe 13 is of a low temperature. As stated hereinbefore, the effectiveness and efficiency of the apparatus may be increased when not employing an artificial source of heat if the hygroscopic material with which the apparatus is charged is capable of readily liberating moisture upon a slight increase in temperature as is the case with hygroscopic material such as wood, charcoal, etc. Various other changes may be made without departing from the spirit of the invention or the scope of the annexed claims.

I claim:

1. Intermittently operating refrigerating apparatus for cooling water comprising an evaporator, means for supplying water to the evaporator, means for permanently removing cool water from the evaporator, an air heat exchanger, a plurality of chambers containing absorbing material, means for alternately cooling one chamber while heating the other and means for periodically and alternately directing air from the atmosphere through one of said chambers, a portion of the heat exchanger, said evaporator, another portion of the heat exchanger and another of said chambers, the arrangement being such that the air flows through the chamber being cooled before flowing through the chamber being heated.

2. Intermittently operating refrigerating apparatus for cooling water comprising an evaporator, means for supplying water to the evaporator, means for permanently removing cool water from the evaporator, a plurality of chambers containing absorbing material, means for alternately cooling one chamber while heating the other and means for periodically directing air from the atmosphere through said chambers and said evaporator in series, the air flowing first through the chamber being cooled, then through the evaporator and then through the chamber being heated.

3. The method of cooling water comprising the steps of drying atmospheric air by passing it in contact with cooled absorbing material, and then passing the dried air in contact with the water to be cooled to cause a portion of the water to evaporate and cool the remainder, and then passing the air in contact with heated absorbing material to cause the air to take up moisture from the heated absorbing material.

4. The method of cooling water comprising the steps of causing air to pass in contact with a stream of water, drying the air passing on its way to contact with the water by exposing it to cooled absorbing material and humidifying the air after it has been passed in contact with the stream of water by exposing it to heated absorbing material.

5. The method of cooling water by causing evaporation of a portion of the water in an evaporator into an air stream, substantially at atmospheric pressure, the method including the steps of periodically causing air to flow first in one direction and then in the opposite direction through vessels in which it comes in contact with absorbing material, then in contact with the water to be cooled and then again in contact with absorbing material and maintaining the absorbing material with which the air first comes in contact, regardless of which direction it is flowing, at a low temperature and maintaining the absorbing material with which the air comes in contact after passing in contact with the water to be cooled at a high temperature.

6. Apparatus for cooling water comprising three chambers connected in series, the first of said chambers containing solid absorbing material, the second chamber constituting an evaporator and the third chamber containing solid absorbent material, means for cooling said first mentioned chamber, means for supplying water to said second mentioned chamber and for permanently removing water therefrom, means for heating said third mentioned chamber and means for causing air to flow through said first, second and third mentioned chambers successively.

7. The arrangement described in claim 6 characterized by the fact that the means for cooling said first mentioned chamber maintains a temperature therein lower than the temperature of the air entering said chamber.

8. The arrangement described in claim 6 characterized by the fact that the means for cooling said first mentioned chamber employs a stream of water.

9. Intermittently operating refrigerating apparatus for cooling water comprising three chambers connected in series, the first chamber containing absorbent material, the second chamber constituting an evaporator and the third chamber containing absorbent material, means for periodically directing air from the atmosphere through said chambers, first in the order in which the chambers are recited and then in the reverse order and means for alternately cooling and heating the first and third mentioned chambers, the chamber through which the air passes first being cooled.

10. The arrangement described in claim 9 characterized by the fact that the air is caused to circulate by gravity action as the result of the heating and cooling of the first and third mentioned chambers.

11. Apparatus for cooling water comprising a first chamber containing absorbent material, an evaporator, a heat exchanger, a second chamber containing absorbent material and means for causing air to flow periodically in series through said apparatus, the flow being first through the first chamber, a portion of the heat exchanger, the evaporator, another portion of the heat exchanger and the second chamber and then through said devices in the reverse order.

12. Apparatus for conditioning a fluid including a plurality of interconnected bodies of absorbent material capable of liberating moisture at room temperature, means for passing humid air over said bodies in series, means for alternately cooling certain of said bodies to cause the same to alternately absorb moisture from the air, means for utilizing the air so dried for a useful purpose, and means whereby the bodies of absorbent not being cooled are alternately regenerated for subsequent use in drying air, the heat required for said regeneration being absorbed from the ambient air.

13. The method of conditioning air by the use of a plurality of bodies of absorbent material capable of liberating moisture at the temperature of ambient air which comprises passing humid atmospheric air over a first body of cooled absorbent material to dry the air, utilizing the air so dried for a useful purpose, and periodically drying air by passing the same over a second cooled body of absorbent material while discontinuing the cooling of said first body and regenerating the same for subsequent use by passing air thereover, the heat required for said regeneration being absorbed from the ambient air.

14. The method of continuously conditioning air by the use of at least two bodies of absorbent material capable of liberating moisture at room temperature one of which bodies is used to condition air while the other body is being reactivated, which method comprises passing humid atmospheric air over one of said bodies while said body is being cooled to dry the air, passing the dried air to a space for utilization therein, simultaneously passing air over another of said bodies of absorbent without cooling the body and thereby reactivating the absorbent by heat derived from the ambient air, and periodically reversing the foregoing steps with respect to said two bodies of absorbent so that air is always being dried by one body of absorbent, and one body is always undergoing reactivation.

15. The method of conditioning the air in a space by the use of a plurality of bodies of absorbent material capable of liberating moisture at the temperature of ambient air comprising passing a stream of humid atmospheric air over a body of cooled absorbent material to dry the air, conducting the air to said space for a useful purpose, withdrawing other air from the space and passing it over a second uncooled body of absorbent material to reactivate the same while absorbing heat from ambient air to facilitate reactivation, and periodically reversing the flow of air over said bodies of absorbent and said space to be conditioned and cooling only the second of said bodies whereby one of said bodies is always being reactivated and one is always drying air, and whereby dried air is supplied to said space substantially continuously.

16. Apparatus for cooling water including a plurality of separate bodies of absorbent material capable of liberating moisture at substantially ambient temperatures, means for passing air over said bodies in series and means for alternately cooling said bodies below the temperature of the air to cause first one of said bodies and then another to take up moisture from the air, and means for utilizing the dried air for cooling water by evaporative cooling.

17. Apparatus for conditioning a fluid including a plurality of separate bodies of absorbent material capable of liberating moisture at substantially ambient temperatures, means for passing moisture laden gas over said bodies in series and means for alternately cooling said bodies to cause the same to alternately absorb moisture from the gas, and means for utilizing the dried air for cooling water by evaporative cooling.

EDMUND ALTENKIRCH.